United States Patent [19]
Winbow et al.

[11] Patent Number: 5,239,514
[45] Date of Patent: Aug. 24, 1993

[54] NARROW BAND MAGNETOSTRICTIVE ACOUSTIC SOURCE

[75] Inventors: Graham A. Winbow, Houston; Sen T. Chen, Sugarland, both of Tex.

[73] Assignee: Exxon Production Research Company, Houston, Tex.

[21] Appl. No.: 958,613

[22] Filed: Oct. 9, 1992

[51] Int. Cl.$^5$ .............................................. G01V 1/00
[52] U.S. Cl. ...................................................... 367/31
[58] Field of Search .................. 367/31, 75, 912, 156, 367/157, 158, 168; 181/102, 104, 105, 106; 310/26, 330

[56] References Cited

U.S. PATENT DOCUMENTS

| | | | |
|---|---|---|---|
| 4,525,645 | 6/1985 | Shirley et al. | 310/337 |
| 4,682,308 | 7/1987 | Chung | 367/31 |
| 4,685,091 | 8/1987 | Chung et al. | 367/912 |

Primary Examiner—Daniel T. Pihulic
Attorney, Agent, or Firm—Susan A. McLean; John R. Casperson

[57] ABSTRACT

A downhole seismic source for producing seismic waves in the 0.2–5 KHz frequency with a bandwidth of between 5 and 50 Hz is formed from a magnetostrictive bar with undamped end weights.

16 Claims, 5 Drawing Sheets

NARROW BAND MAGNETOSTRICTIVE ACOUSTIC SOURCE

BACKGROUND OF THE INVENTION

1. Field of the Invention

This invention relates to a narrow band acoustic source and to a method for constructing and using said source.

2. Description of the Art

Acoustic sources have traditionally been used to obtain well logs with good resolution of geologic features. A source is lowered into a well bore and an acoustic signal is generated, this signal usually having a frequency in the range of 5 kHz to 25 kHz. The signal is then received at receivers which are typically part of the same downhole sonde as the source. These signals provide vertical resolution of features on the order of 1 foot (0.3 m). This technique gives excellent information about the area immediately adjacent to the well bore; however, conventional sources penetrate only a few feet (on the order of 3 meters) beyond the wall of the well bore. The vertical range (distance from sonne to receiver) of the signals is of only a few tens of feet. Well logging with such sources thus does not provide information about the formation very far from the wellbore The limited penetration of conventional acoustic sources is attributable to several factors. Travel through the earth more severely attenuates high frequency signals such as those which are produced by conventional acoustic devices for well logging. Sources currently used for seismic surveying, in which the signal must travel distances of 1000 feet (305 m) or greater, typically operate in the range of approximately 100 Hz and do not have good vertical resolution. Shallow penetration of conventional high frequency acoustic sources is also explained by the relationship of the total power of the device, $P_\Gamma$, to the amplitude A of the signal at the central frequency, $A(\omega_o)$ and the bandwidth of the signal, $\Gamma(Hz)$. As shown in Equation (1):

$$P_\Gamma = 2\pi\Gamma|A(\omega_o)|^2 \quad \text{Eq. (1)}$$

The total power, $P_\Gamma$, is generally fixed by the instrumentation and power supply system. Therefore, is bandwidth decreases, amplitude increases. Total power as also limited by rapid triggering of the source. In typical logging operations, the source is triggered approximately 10-20 times per second. This rate results in less energy being available per pulse, leading to a further amplitude decrease.

A source with narrow bandwidth and a slower cycle rate would generate a more powerful signal and be very desirable.

SUMMARY OF THE INVENTION

In one embodiment, a magnetostrictive bar is encircled by a coil of wire capable of carrying electrical current. The coil traverses bar in helical fashion, but the coil is not in contact with the magnetostrictive bar. A first generally undamped acoustic radiator is attached to a first end of the magnetostrictive bar and a second generally acoustic radiator is attached to a second end of the magnetostrictive bar. The lack of damping reduces bandwidth and increases amplitude. Means for connecting the coil of wire to a source of electrical current are provided. The assembly is positioned in a generally cylindrical sealed housing. A means for affixing the magnetostrictive bar within the generally cylindrical sealed housing is attached to the magnetostrictive bar and the generally cylindrical sealed housing. Preferably, the apparatus operates as a monopole emitter of acoustic waves, which allows for efficient use of lower frequencies.

In another embodiment of the invention, a method for generating an acoustic signal is disclosed. Said method comprises vibrating a pair of generally undamped acoustic radiators by cyclically causing a change in length of a magnetostrictive bar extending between the first and second undamped acoustic radiators which emit the acoustic signal. When only uncrossed radiators are used i.e. all of the energy is directed outwardly in a single vertical plane from the housing in simultaneous oppositely directed pulses, it is possible to achieve higher amplitude at lower frequency than where crossed radiators are used, such as in a quadrapole tool.

In another embodiment of the invention, a method of acquiring seismic data is disclosed comprising positioning a magnetostrictive bar in a borehole. The magnetostrictive bar has a first generally undamped acoustic radiator attached to a first end of the magnetostrictive bar and a second generally undamped acoustic radiator attached to a second end of the magnetostrictive bar is surrounded by a generally cylindrical sealed housing. The method comprises cyclically inducing and terminating a magnetic field in the magnetostrictive bar, so that the first and second undamped acoustic radiators are vibrated and emit an acoustic wave whose frequency is between approximately 250 Hz and approximately 5 kHz and whose bandwidth is between approximately 5 Hz and approximately 50 Hz. Said method further comprises transmitting this acoustic wave through a body of rock surrounding the borehole, reflecting the acoustic wave off an interface within the body of rock and receiving the acoustic wave at a plurality of receivers. An electrical signal representative of the reflected acoustic wave is generated by the plurality of receivers and transmitted to a recording unit, where it is recorded.

DETAILED DESCRIPTION OF THE PREFERRED EMBODIMENT

Figure 1:
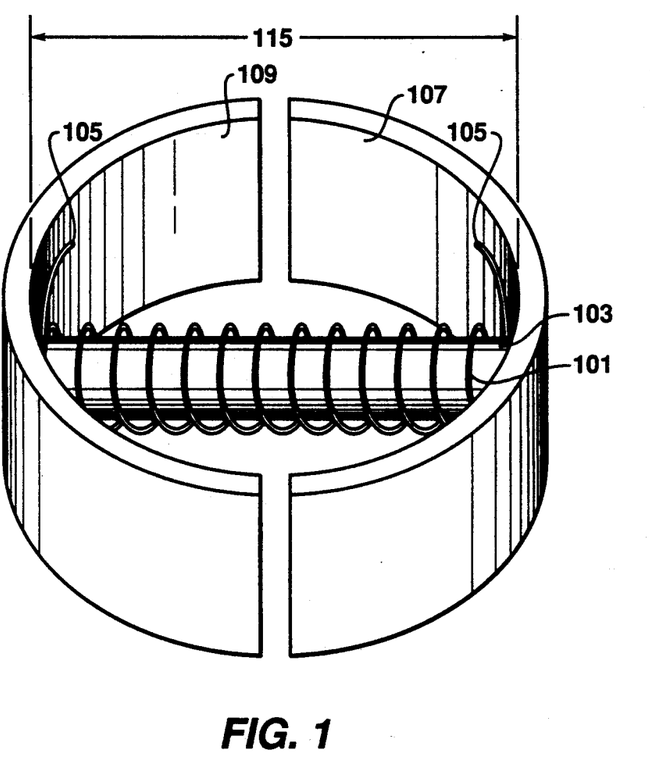
FIG. 1 illustrates pictorially certain features of one embodiment of the invention.
Figure 2:
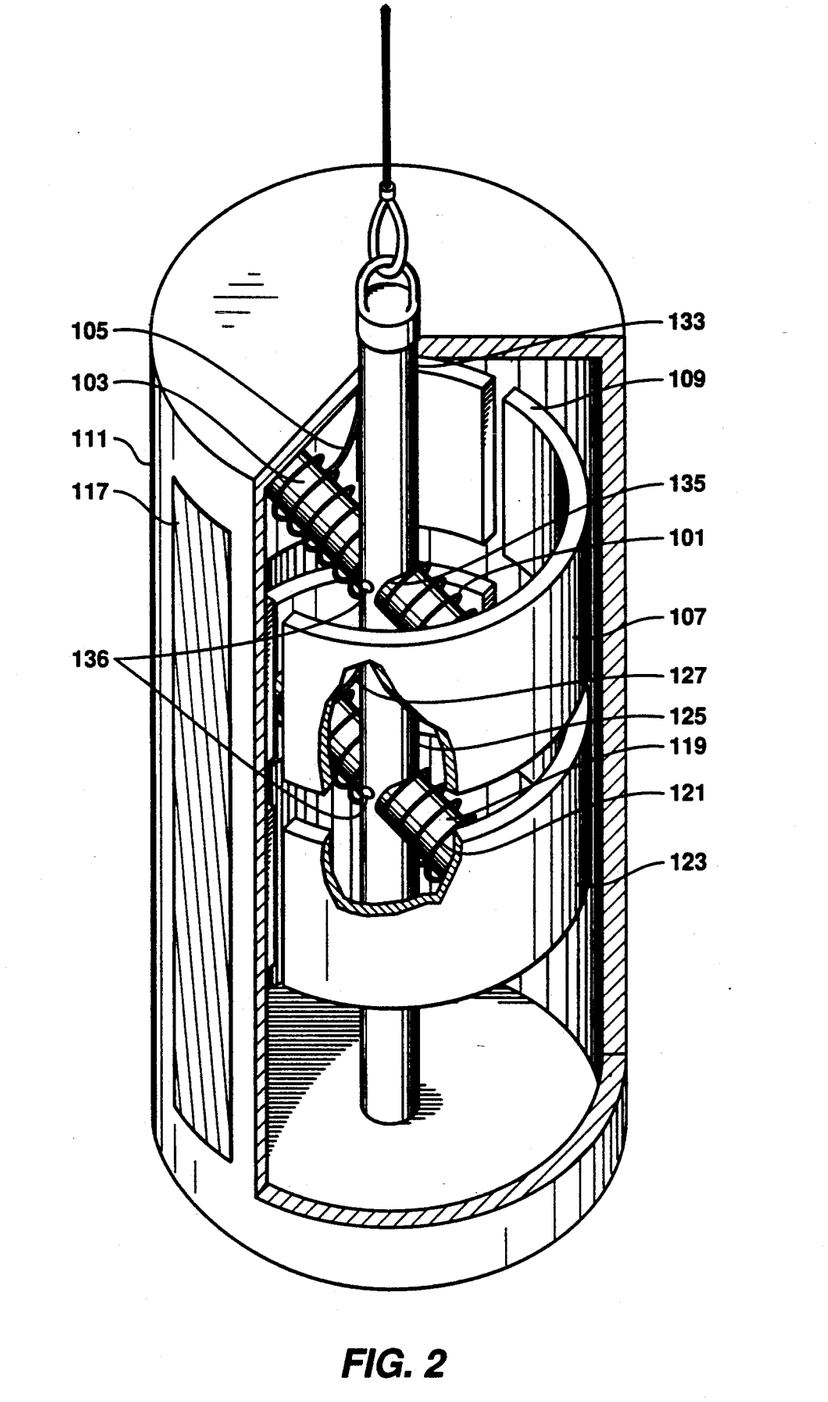
FIG. 2 illustrates in cut-away view one manner in which the structure as shown in FIG. 1 can be deployed in a generally cylindrical sealed housing.
Figure 3:
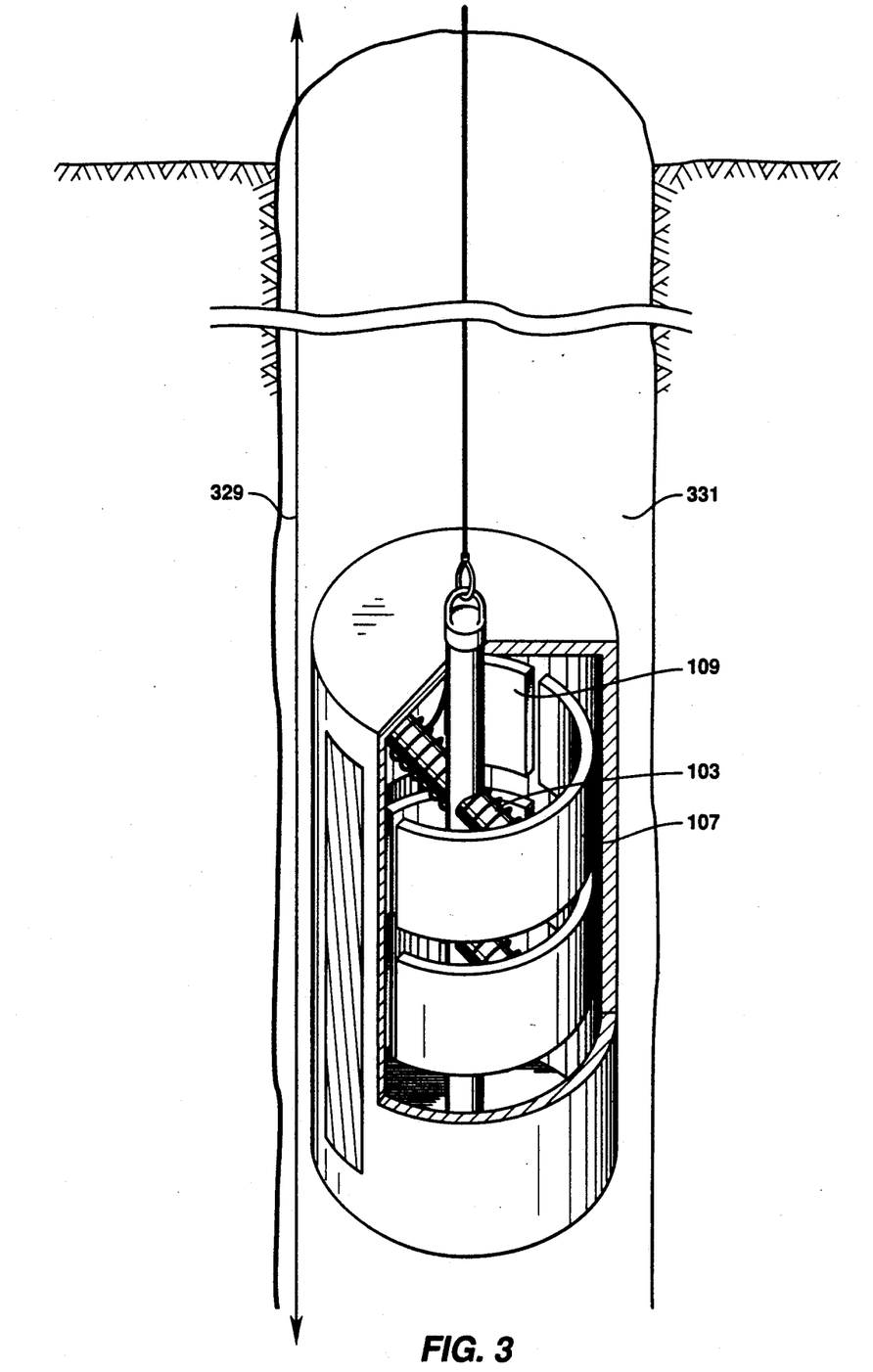
FIG. 3 illustrates an orientation of an embodiment of the invention in a borehole.

In one embodiment of the invention, a coil of electrically conductive wire, indicated at 101 in FIGS. 1 and 2, encircles but does not contact, a magnetostrictive bar, indicated at 103 in FIGS. 1 and 2. A pair of leads 105 connected to the coil serves as a means for connecting the coil of electrically conductive wire to a source of electrical current. A first undamped acoustic radiator, indicated at 107, is affixed to a first end of the magnetostrictive bar. A second undamped acoustic radiator, indicated at 109, is affixed to a second end of the magnetostrictive bar. The radiators can be formed of metal, such as tungsten. In the embodiment shown in FIGS. 1 and 2 where the magnetostrictive bar is generally radially positioned, the radiators have an arcuate shape. More preferably, the radiators are generally "C" shaped and the bar is connected generally radially to the concave side of the radiator. As an example, for a standard borehole, the radiators can be arranged as halves of a cylindrical shell ¼ inch thick, inside radius 2 inches, a length 10 inches and will have a volume of about 35 inches³. When made of stainless steel, they will have a mass of about 10 lb. each. In the embodiment shown in FIG. 5, when the magnetostrictive bar is generally axially positioned, the radiators are preferably generally disk or cylindrically shaped and the bar extends generally normally from a flat face of the radiator.

Nonlinear magnetostrictive bars can be used if desired. Since longer rods produce lower frequencies, using a nonlinear bar can be desirable for certain applications. Generally, the rods will be positioned in a diametrical plane longitudinally slicing the housing. The ends of the rod will be directed generally radially outwardly in opposite directions from the axis of the downhole tool. Circular, elliptical, Ω-shaped and diamond-shaped rods, or rod pairs, are suitable, for example.

In one embodiment, a generally cylindrical sealed housing, indicated at 111 in FIG. 2, surrounds the first acoustic radiator, the second acoustic radiator, the means for connecting the electrically conductive wire and the magnetostrictive bar such that a long axis of the generally cylindrical sealed housing is approximately perpendicular to a long axis of the magnetostrictive bar. In other words the bar extends generally diametrically across the housing. A means for affixing the magnetostrictive bar within the generally cylindrical sealed housing, such as a mandrel 133, connects the magnetostrictive bar with the generally cylindrical sealed housing. In one embodiment the mandrel extends between a first end and second end of the generally cylindrical sealed housing and has at least one eye in which the magnetostrictive bar rests, indicated at 135 in FIG. 2. A mechanical pin 136 may be used to rigidly affix the magnetostrictive bar to the mandrel. Said means for affixing the magnetostrictive bar preferably provides a rigid connection at the point of connection with the bar and allows undamped movement along the length of the magnetostrictive bar and undamped movement of the first and second undamped acoustic radiators. Oil may be used to fill an interior of the generally cylindrical sealed housing, but a damping material such as rubber should not be part of the means for affixing or be located in the interior of the generally cylindrical sealed housing in contact with the source element because it will broaden the bandwidth when the seismic source is used. In the embodiment of the invention shown in FIG. 5, the magnetostrictive bar has an eye extending generally axially through its length and the magnetostrictive bar is mounted on the mandrel which itself is positioned along the longitudinal axis of the housing. This embodiment allows for greater mass and length of magnetostrictive material and is thus preferred for some applications.

The magnetostrictive bar may be constructed of any magnetostrictive material, such as iron or nickel. Preferably, a magnetostrictive material which expands on the application of a magnetic field is used. In a preferred embodiment, the magnetostrictive bar is comprised of 2V permendur, a ferromagnetic material having a positive strain constant with a relatively high absolute value.

A desired resonant frequency, $F_R$, may be selected based on Equation 2, wherein E is Young's modulus of elasticity of the magnetostrictive bar, A is the cross-sectional area of the bar, M is the mass of the first and of the second radiator, and L is a length of the bar, indicated at 115:

$$F_R = \frac{1}{2\pi} \sqrt{\frac{2EA}{ML}} \qquad \text{Eq. (2)}$$

A desired frequency is therefore predictably and easily attained. In the embodiment shown in FIGS. 1 and 2, the diameter of the magnetostrictive bar can generally be between approximately ¼ inch (0.64 cm) and approximately ⅜ inch (0.95 cm), the length of the magnetostrictive bar, as measured along the long axis, indicated at 115, is between approximately 3 inches (7.6 cm) and approximately 4 inches (9.2 cm), and the mass of the first undamped acoustic radiator and the second undamped acoustic radiator is between approximately 1 lb (0.45 kg) and approximately 10 lb (4.5 kg).

A source built within these dimensions will have a frequency in the range of 250 Hz to 5 kHz and fit in most oil and gas wellbores. Preferably the tool operates at a frequency in the range of 500-2000 Hz, and even more preferably in the range of 500-1200 Hz for good penetration and good resolution.

In the FIG. 2 embodiment, the first undamped acoustic radiator, indicated at 107, has an outer surface which is shaped arcuately outward and the second acoustic radiator, indicated at 109, has an outer surface which is shaped arcuately outward, and the outer surface of the first acoustic radiator and the outer surface of the second acoustic radiator are positioned generally concentrically with the outer cylindrical surface of the generally cylindrical sealed housing, indicated at 111 in FIG. 2.

In one embodiment of the invention, the generally cylindrical sealed housing, indicated at 111 in FIG. 2, has a sidewall formed from an elastomeric sleeve. In another embodiment of the invention, the generally cylindrical sealed housing is formed from a metal housing with a plurality of ports 117. The ports can be sealed by an elastomeric material, such as rubber sheet.

Figure 5:
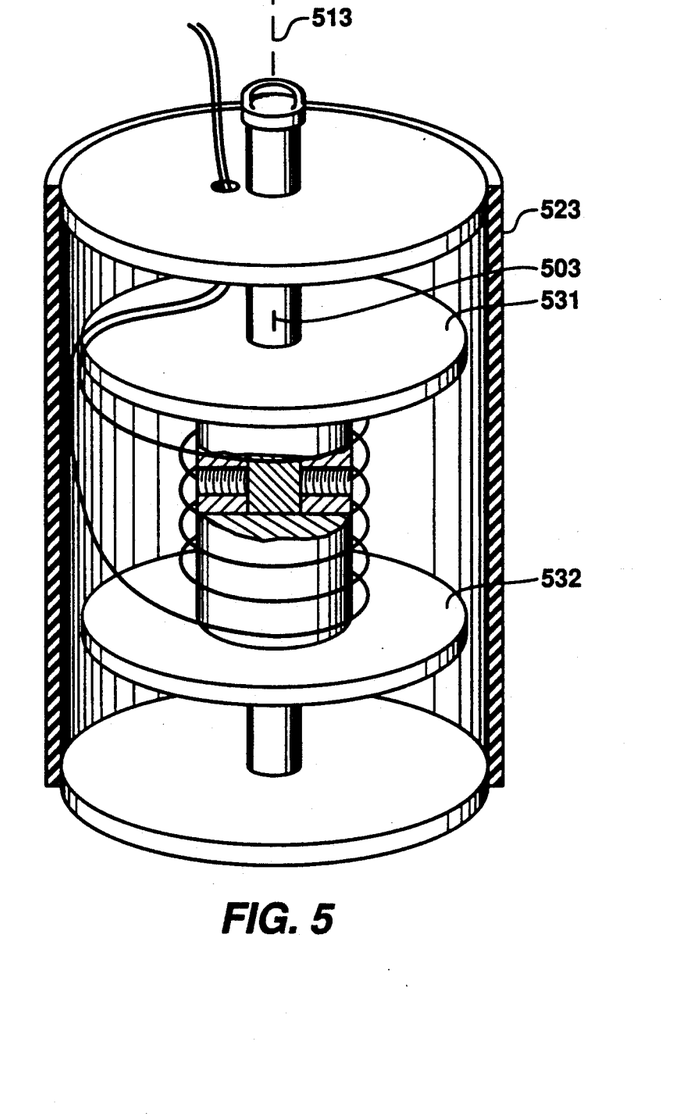
FIG. 5 pictorially illustrates, in partial cross-section, certain features of another embodiment of the invention.

To fabricate the invention, the first magnetostrictive bar, indicated at 103, is spirally wrapped with a first electrically conductive wire, indicated at 101, such that the first electrically conducting wire covered with an insulating layer traverses a long axis of the first magnetostrictive bar, indicated at 115. The method further comprises affixing a first undamped acoustic radiator, indicated at 107, at a first end of the first magnetostrictive bar, affixing a second undamped acoustic radiator indicated at 109 to a second end of the first magnetostrictive bar, and connecting a first means for conducting electrical current, indicated at 105 to the first electrically conductive wire. The first magnetostrictive bar, the first electrically conductive wire, the first undamped acoustic radiator, the second undamped acoustic radiator, and the first means for conducting electrical current are positioned within a generally cylindrical sealed housing, indicated at 111. In one embodiment of the invention these elements are positioned Within the generally cylindrical sealed housing such that a long axis of the first magnetostrictive bar is generally perpendicular to a long axis of the generally cylindrical sealed housing, indicated at 113 in FIG. 2. In an alternate embodiment of the invention, (see FIG. 5) these elements are positioned within the generally cylindrical sealed housing by a means 505 such that the long axis of the first magnetostrictive bar, indicated at 503 in FIG. 5, is generally parallel to the long axis 513 of the generally cylindrical sealed housing 523. Orientation in this alternate embodiment allows for greater power and lower frequency because the magnetostrictive bar can be made more massive in diameter and length and the end masses 531, 532 can be made heavier.

Greater total energy output for the radial-bar embodiment may be achieved by stacking a plurality of the acoustic elements in the housing. The elements are aligned in a common plane. To achieve this, one embodiment of the invention provides a second magnetostrictive bar, indicated at 119 in FIG. 2, encircled with a coil of a second electrically conductive wire, indicated at 121, such that the second electrically conductive wire traverses a long axis of the second magnetostrictive bar but is spaced apart from the second magnetostrictive bar at all points along the long axis of the second magnetostrictive bar. A third undamped acoustic radiator, indicated at 123 in FIG. 2, is affixed to a first end of the second magnetostrictive bar. A fourth undamped acoustic radiator, indicated at 125 in FIG. 2, is affixed to a second end of the second magnetostrictive bar. A second means for conducting electrical current, indicated at 127 in FIG. 2, is connected to the second electrically conductive wire, such that a current will flow through the second electrically conductive wire. The second magnetostrictive bar, wire, and acoustic radiators are positioned all within the generally cylindrical sealed housing, such that the long axis of the second magnetostrictive bar is perpendicular to the long axis of the generally cylindrical sealed housing and parallel to the long axis of the first magnetostrictive bar.

In the just described embodiment of the invention, the third undamped acoustic radiator, indicated at 123, is vertically aligned with the first undamped acoustic radiator, indicated at 107, and the fourth undamped acoustic radiator, indicated at 125, is vertically aligned With the second undamped acoustic radiator, indicated at 109 in FIG. 2. This method of construction, as noted, will increase total energy output of the tool.

In a preferred embodiment, the first means for conducting electrical current, indicated at 105, and the second means for conducting electrical current, indicated at 127, are wired such that a current may be simultaneously applied to the first magnetostrictive bar, indicated at 103, and to the second magnetostrictive bar, indicated at 119.

Another embodiment of the invention provides a method of generating an acoustic signal comprising cyclically causing a change in the length of a long axis of a magnetostrictive bar, said magnetostrictive bar having a first undamped acoustic radiator, attached to a first end of the magnetostrictive bar and a second undamped acoustic radiator attached to a second end of the magnetostrictive bar, and vibrating the first undamped acoustic radiator and the second undamped acoustic radiator, thereby emitting an acoustic signal. The change in the length of the long axis of the magnetostrictive bar, is caused by flowing an electrical current through a coil of wire encircling but not in electrical contact with the magnetostrictive bar, thereby inducing a magnetic field in the magnetostrictive bar. The current is turned on and off at a rate to produce the desired acoustic signal. The radiators are preferably vibrated so as to generate a signal whose frequency is between approximately 250 Hz and approximately 5 kHz and whose bandwidth is between approximately 5 Hz and approximately 50 Hz. More preferably, the signal is emitted at a frequency in the range of 500–1500 Hz and with a bandwith in the range of 10–30 Hz.

Figure 4:
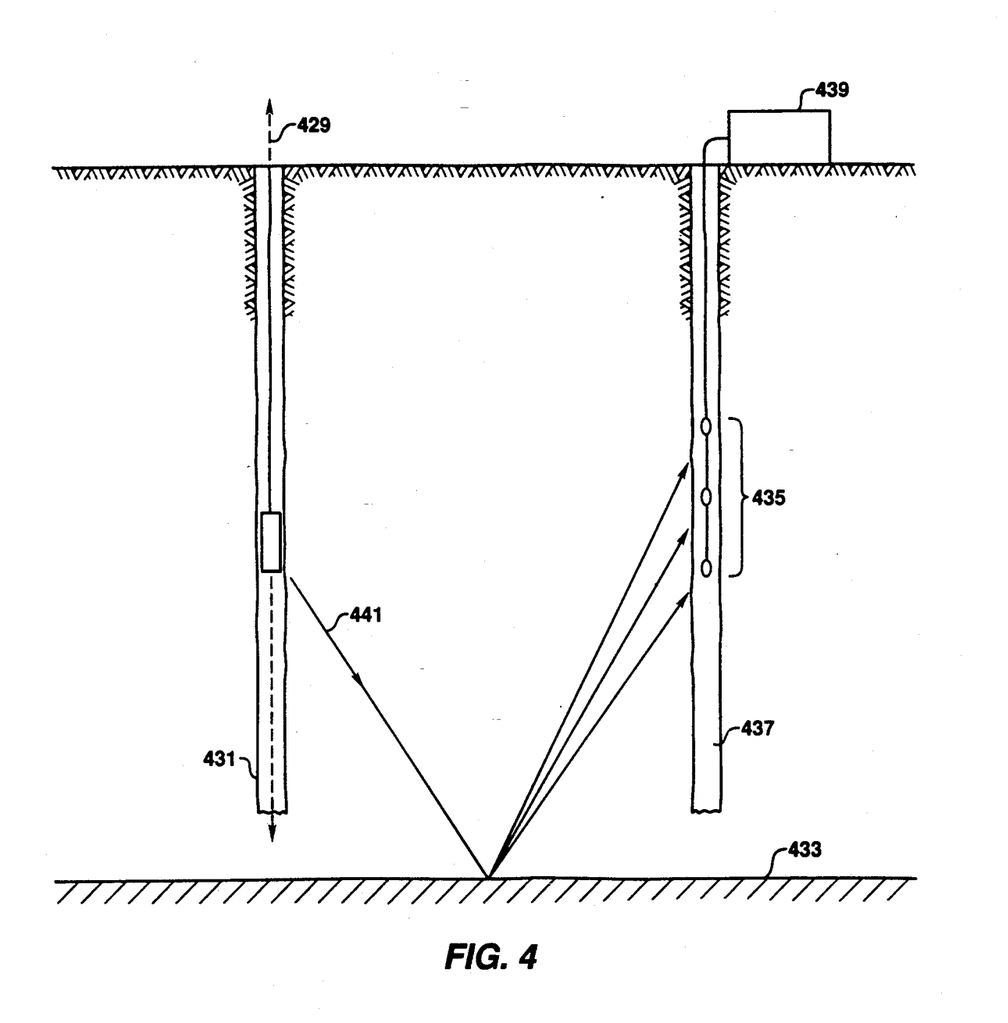
FIG. 4 illustrates a cross-sectional view of an embodiment of the invention providing a method of acquiring seismic data.

Another embodiment of the invention provides a method for acquiring seismic data. A magnetostrictive bar is positioned such that a long axis of the magnetostrictive bar is perpendicular to a long axis of the borehole. The bar is positioned in a housing which is positioned via a cable 429 which contains the power supply within a borehole, such that a long axis of the generally cylindrical sealed housing is generally parallel with a vertical axis of the borehole. A magnetic field is cyclically induced and terminated in the magnetostrictive bar, thereby vibrating the first undamped acoustic radiator and the second undamped acoustic radiator. An acoustic wave is emitted from the first undamped acoustic radiator and the second undamped acoustic radiator preferably at a frequency between approximately 250 Hz and approximately 5 kHz, preferably 500–1500 Hz and a bandwidth between approximately 5 Hz and approximately 50 Hz, preferably 10–30 Hz. The desired frequency can be calculated by application of Equation 2. The desired bandwidth is achieved largely through the fact that vibration of the first and second acoustic vibrators is generally undamped. The acoustic wave thus produced is transmitted through a body of rock surrounding the borehole, reflected off an interface 433 within said body of rock, and received the acoustic wave at a plurality of receivers indicated at 435 positioned in a borehole. This method is applicable both to a plurality of receivers placed within the same borehole as the source and to a plurality of receivers placed in a different borehole as the source, as shown at 437 in FIG. 4. Either embodiment will provide far-field information with respect to the source. By far-field is meant information about formations greater than about 50 feet from the source, such as information about formations 500 feet or more from the source. An electrical signal representative of the acoustic wave is produced by the receivers and is transmitted to a recording unit indicated at 439 in FIG. 4. The electrical signal is there recorded as is known in the art.

In a preferred embodiment of the invention, the aforementioned magnetic field is induced in the magnetostrictive bar for an interval of approximately one second approximately once per minute. As noted previously, this provides an increase in energy available per pulse, as compared with conventional use of an acoustic source.

In another embodiment of the inventory a method for acquiring seismic data further comprises recording one phase shift per source-receiver location, rather than recording one travel time. Such a phase shift would be relatively independent of source and receiver coupling and other experimental complications. Acoustic waves can also be produced and recorded for a number of additional frequencies, for example 250 Hz, 500 Hz, 750 Hz, and 1000 Hz, thereby further enhancing a resultant image. First approximation images can be formed by the Born or Rytov methods as is known in the art and discussed in the theoretical literature. See A. J. Devaney, Geophysical Diffraction Tomography, IEE Trans. Geological Science, vol. GE-22, pp. 3-13 (1984).

We claim:

1. A method of generating an acoustic signal, said method comprising:
   a. cyclically causing a change in the length of a magnetostrictive bar having a first end and a second end, said magnetostrictive bar having a first generally undamped acoustic radiator attached to its first end and a second generally undamped acoustic radiator attached to its second end; and
   b. vibrating the first acoustic radiator and the second acoustic radiator, thereby emitting the acoustic signal,
   wherein the first generally undamped acoustic radiator and the second generally undamped acoustic radiator are vibrated so as to generate a signal whose frequency is between approximately 250 Hz and approximately 5 kHz and whose bandwidth is between approximately 5 Hz and approximately 50 Hz.

2. A method of generating an acoustic signal, said method comprising:
   a. cyclically causing a change in the length of a magnetostrictive bar having a first end and a second end, said magnetostrictive bar having a first generally undamped acoustic radiator attached to its first end and a second generally undamped acoustic radiator attached to its second end; and
   b. vibrating the first acoustic radiator and the second acoustic radiator, thereby emitting the acoustic signal,
   wherein the first generally undamped acoustic radiator and the second generally undamped acoustic radiator are vibrated so as to generate a signal whose frequency is between approximately 500 Hz and 1500 kHz and whose bandwidth is between approximately 10 Hz and approximately 30 Hz.

3. A method of generating an acoustic signal, as recited in claim 2, further comprising:
   a. positioning the magnetostrictive bar generally diametrically across a generally cylindrical sealed housing such that an outer arcuate surface of the first generally undamped acoustic radiator and an outer arcuate surface of the second generally undamped acoustic radiator are both concentric with the generally cylindrical sealed housing; and
   b. positioning the generally cylindrical sealed housing within a borehole, such that the long axis of the generally cylindrical sealed housing is generally parallel with a vertical axis of the borehole, so that the bar is positioned generally diametrically across the borehole.

4. An apparatus for generating an acoustic signal, said apparatus comprising:
   a. a magnetostrictive bar;
   b. a coil of electrically conductive wire encircling, but not in contact with, the magnetostrictive bar;
   c. a means for connecting the coil of electrically conductive wire to a source of electrical current;
   d. a first generally undamped acoustic radiator affixed to a first end of the magnetostrictive bar;
   e. a second generally undamped acoustic radiator affixed to a second end of the magnetostrictive bar;
   f. a generally cylindrical sealed housing surrounding the first generally undamped acoustic radiator and the second generally undamped acoustic radiator the means for connecting the coil of electrically conductive wire and the magnetostrictive bar, and
   g. a means for affixing the magnetostrictive bar within the generally cylindrical sealed housing,
   in which the means for affixing the magnetostrictive bar within the generally cylindrical sealed housing is comprised of a mandrel having a first and a second end and fastened by each of its ends to the generally cylindrical sealed housing and a pin linking the magnetostrictive bar to the mandrel, such that movement of the magnetostrictive bar, the first generally undamped acoustic radiator and the second generally undamped acoustic radiator is generally undamped.

5. An apparatus as in claim 4 wherein the mandrel is positioned along a longitudinal axis of the sealed housing and the magnetostrictive bar is positioned in a generally longitudinal lane which extends generally diametrically across the housing.

6. Apparatus as in claim 4 wherein the mandrel is positioned along a longitudinal axis of the sealed housing and the magnetostrictive bar extends generally longitudinally in the housing surrounding said mandrel.

7. An apparatus, as recited in claim 5, wherein the magnetostrictive bar is comprised of 2V permendur.

8. An apparatus, as recited in claim 4, wherein the first generally undamped acoustic radiator is comprised of tungsten and the second generally undamped acoustic radiator is comprised of tungsten.

9. An apparatus for generating an acoustic signal, said apparatus comprising:
   a. a magnetostrictive bar;
   b. a coil of electrically conductive wire encircling, but not in contact with, the magnetostrictive bar;
   c. a means for connecting the coil of electrically conductive wire to a source of electrical current;
   d. a first generally undamped acoustic radiator affixed to a first end of the magnetostrictive bar;
   e. a second generally undamped acoustic radiator affixed to a second end of the magnetostrictive bar;
   f. a generally cylindrical sealed housing surrounding the first generally undamped acoustic radiator and the second generally undamped acoustic radiator the means for connecting the coil of electrically conductive wire and the magnetostrictive bar, and
   g. a means for affixing the magnetostrictive bar within the generally cylindrical sealed housing,
   in which the generally cylindrical sealed housing comprises an elastomeric sidewall.

10. An apparatus, as recited in claim 5, wherein the diametrical cross-sectional area of the magnetostrictive bar is between approximately $\frac{1}{4}$ inch (0.6 cm) and approximately $\frac{3}{8}$ inch (0.95 cm), a length of the magnetostrictive bar, as measured along the long axis, is between approximately 3 inches (7.6 cms) and approximately 4-inches (9.2 cms), and the combined masses of the first acoustic radiator and the second acoustic radiator is between 1 lb (0.45 kg) and 10 lb (4.5 kg).

11. A method of acquiring seismic data, comprising:
   a. positioning a magnetostrictive bar in a borehole, said magnetostrictive bar having a first generally undamped acoustic radiator attached to a first end of the magnetostrictive bar and a second undamped acoustic radiator attached to a second end of the magnetostrictive bar and said magnetostrictive bar being surrounded by a generally cylindrical sealed housing;
   b. cyclically inducing a magnetic field in the magnetostrictive bar, thereby vibrating the first undamped acoustic radiator and the second undamped acoustic radiator;

c. emitting an acoustic wave whose frequency is between approximately 250 Hz and approximately 5 kHz and whose bandwidth is between approximately 5 Hz and approximately 50 Hz from each undamped acoustic radiator;
d. transmitting the acoustic wave through a body of rock surrounding the borehole;
e. reflecting the acoustic wave off an interface within the body of rock surrounding the borehole;
f. receiving the acoustic wave at a plurality of receivers positioned in a borehole, said borehole being the same or different from the borehole in which the housing is positioned;
g. producing an electrical signal representative of said acoustic wave in each of said receivers;
h. transmitting said electrical signal to a recording unit; and
i. recording said signal in said recording unit.

12. A method of acquiring seismic data, as recited in claim 11, wherein the magnetic field is induced for an interval of approximately one second approximately once per minute.

13. A method of acquiring seismic data, as recited in claim 11, wherein recording said signals comprises recording one phase shift for each source receiver location.

14. A method as in claim 11 wherein the magnetostrictive bar has a long axis and is positioned in said borehole so that said long axis extends generally diametrically across said borehole.

15. A method as in claim 11 wherein the magnetostrictive bar has a long axis and is positioned in said borehole so that said long axis is generally parallel to said borehole axis.

16. A method as in claim 11 wherein the acoustic wave has a frequency between about 500 Hz and 1500 Hz and a bandwidth of between about 10 Hz and about 30 Hz.

* * * * *